United States Patent
Wahba et al.

[15] 3,653,917
[45] Apr. 4, 1972

[54] ANGEL FOOD CAKE MIXES AND THEIR PRODUCTION

[72] Inventors: Issac J. Wahba, Minneapolis; Daniel F. Padrnos, Hamel; Shao-Mu Ma, Minneapolis, all of Minn.

[73] Assignee: General Mills, Inc.

[22] Filed: Feb. 5, 1970

[21] Appl. No.: 9,035

[52] U.S. Cl. ............................................................99/94
[51] Int. Cl. ...................................A21d 2/00, A23l 1/00
[58] Field of Search ..............................................99/92, 94

[56] References Cited

UNITED STATES PATENTS

| | | | |
|---|---|---|---|
| 2,930,698 | 3/1960 | Barch et al. | 99/92 |
| 3,459,560 | 8/1969 | Shea | 99/92 |

*Primary Examiner*—Raymond N. Jones
*Attorney*—Anthony A. Juettner and Gene O. Enockson

[57] ABSTRACT

Tolerance of certain angel food cake mixes is improved by the addition of calcium chloride.

5 Claims, No Drawings

ANGEL FOOD CAKE MIXES AND THEIR PRODUCTION

This invention relates to angel food cake mix production and to the resulting angel food cake mixes. More particularly, it relates to the production of such mixes with increased tolerance to variations in ingredient quality and amounts.

Angel food cake mixes were introduced into the trade in the early 1950's and have been sold in substantial quantities ever since their introduction. Because angel food cakes require a substantial number of egg whites (approximately a dozen) in their preparation, the dry mixes which already contained an equivalent amount of dehydrated egg whites were readily accepted by the housewife. The introduction of such mixes in the 1950's was made possible primarily due to improvements made in the production of dehydrated egg whites of reasonable quality.

The initially introduced angel food cake mixes were of the two stage variety, that is they were made up of two fractions. One fraction contained the egg whites with at least some of the sugar and this fraction was rehydrated and whipped. After the egg white foam was formed, the second fraction containing the flour and other ingredients was folded into the egg white foam with some care. In the food art, it has always been a recognized objective to increase convenience without loss of quality by reducing the steps necessary to prepare a given food and by using high quality ingredients. Thus as early as 1931, it was disclosed that various cakes including angel food cakes could be prepared in a single mixing step by using either mechanical agitation or the liberation of carbon dioxide gas as a result of the introduction of baking power or a combination of the two.

It was only natural and obvious that cake mix producers would proceed with efforts to introduce angel food cake mixes of high quality which could be prepared by the housewife in a one stage mixing procedure. Quality factors to be considered include cake volume (as sometimes measured by height in a standard sized pan), grain, tenderness, flavor, crust and presence or absence of gummy areas or layers and cupping or partial or total collapse on cooling of the cake. Continued improvement through the years in flour, egg whites and other ingredients have made it possible to introduce so-called one stage angel food cake mixes—that is, mixes which can be rehydrated and mixed in one operation to provide a batter capable of yielding a quality angel food cake. However, despite improvements in flour milling and egg white production, these mixes sometimes lack tolerance and yield cakes of reduced volume or which show knotting or gummy layers (severe knotting). It is believed that such lack of tolerance is due primarily to flour or dehydrated egg whites which are out of specification. Large amounts of mix are subject to rejection by the manufacturer when it is shown that the same will not yield the high quality angel food cake which the housewife has come to expect.

It is, therefore, an object of the present invention to provide angel food cake mixes of improved tolerance. Another object of the invention is to provide a process for producing angel food cake mixes with improved tolerance. These and other objects will become apparent from the following detailed description.

We have now discovered that angel food cake mixes of increased tolerance can be produced by including in such mixes a minor amount of calcium chloride. While we do not fully understand the action of the calcium chloride, it is believed that the same functions to alter the rehydration characteristics of the egg white when the same is of reduced quality and/or the gelatinization temperature of the wheat flour when the same does not have optimum pH or protein content. Our invention has allowed the salvaging of large quantities of mix which had been rejected since sample cakes produced therefrom were of reduced volume and/or exhibited knotting even to the point of gummy layer formation.

The mixes produced according to the present invention comprise the normally used ingredients plus the calcium chloride which is preferably used in anhydrous form. The normal ingredients include a farinaceous material, sugar, dehydrated egg whites, balanced chemical leavening, excess acidifier and pregelatinized starch. Various coloring and flavoring agents may be included as well as known whipping aids such as modified soy protein. Tenderizing agents such as oxidized wheat starch can also be included.

The farinaceous material may be wheat flour or a mixture thereof with raw wheat starch. The wheat flour is chlorine bleached and has a pH of between about 3.0 and 4.5 (as measured on a 10% flour:water slurry) and more preferably about 3.7 to 3.9. The protein content is also below about 4.5 and preferably in the range of about 3.0 to 4.0. As indicated, a portion of the farinaceous material in the mix can be raw wheat starch. When such mixture is used, the wheat flour should comprise at least about 15 percent by weight and preferably at least about 20 percent by weight of the mixture.

The sugar can be any of those commonly employed in the preparation of angel food cakes. Sucrose is entirely suitable. The sugar may be used in powdered form and may contain a small amount of raw wheat starch as a grinding aid. Any of the commercially available dehydrated egg white products can be used. As indicated, these products vary somewhat from lot to lot in an unknown manner even from a single manufacturer and are believed to be the cause of a part of the lack of tolerance in the angel food cake mixes.

The balanced chemical leavening consists of sodium bicarbonate and an acidifier in an amount sufficient to yield all of the carbon dioxide contained in the sodium bicarbonate when reacted therewith. The precise amount of acidifier varies with the particular agent employed since such agents have different neutralization values. Representative acidifiers to be used in the balanced chemical leavening include glucona-delta lactone, potassium bitartrate, tartaric acid, dissodium phosphate, sodium aluminum sulfate, sodium acid pyrophosphate, anhydrous monocalcium phosphate, monocalcium phosphate monohydrate, citric acid, fumaric acid, adipic and the like. Mixtures of acidifying agents can be used. Since the acidifier generally determines the temperature and point in time when the carbon dioxide is released, the same will be selected with these factors in mind. For example, where substantial release of carbon dioxide is desired in the batter preparation stage, a quick acting acid such as citric acid would conventionally be selected.

The mixes also include acidifier in excess of that required for reaction with the sodium bicarbonate. Such excess acidifier is not needed to react with and thus aid in the production of carbon dioxide from the sodium bicarbonate. Instead it is conventionally included in angel food cake preparation to lower the pH of the batter and the crumb of the resulting angel food cakes. The excess acidifier tends to improve the whiteness of the resulting angel food cake and also the general rating thereof. Volume is also generally increased somewhat, probably due to the modification of egg white so that the same is capable of retaining more gas during the batter and baking stages. The acidifier is preferably the same as those described with regard to the balanced chemical leavening. The excess acidifier will be used to lower the batter pH to between about 5.5 to 6.8.

The pregelatinized starch is used for its known functions in cake batter preparations. Thus the same functions to increase water adsorption thus increasing batter viscosity and aiding in the retention of the leavening gas in the batter preparation stage and in the early stages of baking. The starch, preferably corn starch, is pregelatinized by heating a water slurry thereof to the gelatinization point or slightly above. This can be accomplished by laying a thin film of the slurry on a heated roll which gelatinizes and dries the product. It is then scraped off the roll by a stationary knife and pulverized. Other gelatinization methods can also be used. Thus, the starch can be gelatinized by passing it through a hot Votator before drying. A variety of pregelatinize starches can be included in the compositions of the present invention. Particularly suitable products are available from American Maize Products Co.

and Corn Products Co. under the designations "HRN 844" and "B 111," respectively.

The modified soy protein whipping aid is also a commercially available material. It is generally prepared by putting purified soy protein into solution and acidifying the solution with hydrochloric acid. An enzyme, such as pepsin, is then added to modify the soy protein in order to enhance its foam promoting properties. After sufficient enzymatic action, the solution is heated to deactivate the enzyme and the pH is readjusted with sodium hydroxide. One such partially digested or degraded soy protein is available from the Whitson Products Division of the Borden Company under the designation "Whitson's Whipping Agent No. 3618." Other such materials are described in U.S. Pat. Nos.: 2,489,173; 2,489,208; 2,502,029; 2,502,482; and 2,588,419. Whitson's Whipping Agent No. 3618 is creamy white, has a pie density of 2.1 lbs./gallon (maximum), has a pH of 5.0 to 6.0, has a granulation such that it passes a No. 50 U.S. Standard Sieve and contains approximately 63% protein (N × 6.25) and 26.5% sugar (as sucrose).

Oxidized wheat starch, which may be included as a cake tenderizer, is prepared by treating raw wheat starch with sodium hypochlorite, followed by neutralization, purification and drying. Oxidation with sodium hypochlorite reduces the polymer chain length by chemical reaction and some carboxyl groups are formed on the linear chain. However, the physical structure of the granule is essentially unchanged and the treated starch is white and free flowing. One preferred oxidized raw wheat starch is Hercules HMD 1194 (described in Bulletin VC-SD-S, Jan. 7, 1963, of the Hercules Powder Company). This starch has the following properties: moisture — 10.4%; protein content — 0.1%; ash — 0.66%; salt (NaCl)— 0.06%; viscosity (Scott)— 36/50; and pH — 6.4.

Representative flavoring agents which may be included in the mixes are salt (NaCl) vanilla powder, almond powder, strawberry flavoring and the like. Various edible dyes can be used where desired.

The amounts of the various ingredients in the angel food cake mixes improved by the addition of calcium chloride in accordance with our invention can vary over reasonably wide limits. The approximate percentages of the conventional ingredients generally fall within the following ranges:

| Ingredient | Approximate % By Weight |
| --- | --- |
| Sugar | 55–70 |
| Farinaceous material | 15–25 |
| Dehydrated egg whites | 6.5–12 |
| Balanced chemical leavening | |
| Sodium bicarbonate | 0.75–2.5 |
| Acidifier - amount sufficient to yield all of the $CO_2$ when reacted with the bicarbonate | — |
| Excess acidifier—sufficient to yield a batter pH of about 5.5–6.8 | — |
| Pregelatinized starch | 0.5–3.0 |
| Modified soy protein whipping aid | 0–2.0 |
| Oxidized wheat starch | 0–6.0 |
| Flavoring agents, colorants | 0–5.0 |

The calcium chloride is added to the mix in an amount sufficient to increase the tolerance thereof as above described. Preferably, the same will be added in amounts between about 0.1 and 1.0 percent by weight, and more preferably between about 0.2 to 0.6 percent by weight. Above about 0.6 percent, taste may be adversely affected an below about 0.1 percent, a reduced increase in tolerance is achieved.

Our mixes are prepared by simply dry blending the various ingredients including the calcium chloride. Batters are prepared from the mixes by adding water followed by agitation. Generally about 10 ounces of water are used for each 14 to 18 ounces of mix. More or less water may be used depending on the cake moistness desired. The angel food cakes are prepared by baking the batters at 340–375° F. for 30–60 minutes.

The following example is given by way of illustration and not in limitation.

EXAMPLE

A mix was prepared by dry blending the following ingredients:

| Ingredients | Parts By Weight |
| --- | --- |
| Sucrose (fine grind, contained 20% by weight raw wheat starch) | 63.21 |
| Chlorine bleached wheat flour (pH 3.7, protein 3.6%) | 19.84 |
| Dehydrated egg whites (supplier H) | 9.00 |
| Oxidized wheat starch (HMD-1194) | 3.00 |
| Balanced chemical leavening | |
| Sodium bicarbonate | 1.66 |
| Citric acid | 1.28 |
| Excess acidifier—citric acid | 0.17 |
| Pregelatinized corn starch (HRN-844) | 1.00 |
| Enzymatically modified soy protein (Whitson's Whip No. 3618) | 0.30 |
| Vanilla powder | 0.45 |
| Almond powder | 0.09 |

A batter was prepared by placing 17 oz. of the mix in a mixing bowl, adding 11.3 oz. of water and mixing with a household mixer at medium speed (500 rpm) for 1 minute. The resulting batter was placed in an ungreased 10 inches × 4 inches tube pan and baked 45 minutes in an oven preheated to 350° F. The resulting angel food cake had a height of 113 mm. and exhibited some knotting.

When 0.4% $CaCl_2$ (anhydrous) was added to the mix and a batter was prepared and baked as above described, the resulting angel food cake had a height of 121 mm. and was free from knotting. The lack of tolerance of the mix without the $CaCl_2$ was apparently due to low quality egg whites. This clearly demonstrates the value of the invention. Similar results were achieved when the mixes failed to meet specification because the flour was not optimum in pH and/or protein content.

Multiple thousands of pounds of rejected mix were salvaged for sale by the addition of 0.4% $CaCl_2$ (anhydrous). In such instance, the below specification characteristics resulting in the rejection were apparently caused by a low quality lot of dehydrated egg whites. The improved tolerance is achieved without detrimental effect to stability or good characteristics of the resulting angel food cakes.

It is to be understood that the invention is not to be limited to the exact details of operation or the exact processes and compositions shown and described, an obvious modifications will be apparent to those skilled in the art and the invention is to be limited only by the scope of the appended claims.

We claim:

1. In an angel food cake mix comprising sugar, a farinaceous material which is a chlorine bleached wheat flour having a pH of 3.0 to 4.5 and a protein content of 3.0 to 4.5% or a combination thereof with raw wheat starch, dehydrated egg whites, pregelatinized starch, balanced chemical leavening and excess acidifier, the improvement comprising including calcium chloride as a part of such mix in an amount sufficient to increase the tolerance of the mix to variations in ingredient quality and amounts.

2. The angel food cake mix of claim 1 wherein the calcium chloride is included in an amount of about 0.1 to 1.0% by weight.

3. The angel food cake mix of claim 2 wherein the conventional ingredients are present as follows (by weight): about 55–70% sugar, about 15–25% farinaceous material, about 6.5–12% dehydrated egg whites, about 0.75–2.5% sodium bicarbonate, about 0.5–3.0% pregelatinized starch and an acidifier in an amount sufficient to yield (a) all of the $CO_2$ when reacted with the sodium bicarbonate and (b) a batter having a pH of about 5.5–6.8.

4. In the process of preparing an angel food cake mix by dry blending sugar, a farinaceous material which is a chlorine bleached wheat flour having a pH of 3.0 to 4.5 and a protein content of 3.0 to 4.5 percent or a combination thereof with raw wheat starch, dehydrated egg whites, pregelatinized starch, balanced chemical leavening and excess acidifier, the improvement comprising adding calcium chloride to said mix and blending the same with the other ingredients, said calcium chloride being used in an amount sufficient to increase the tolerance of the mix to variations in ingredient quality and amounts.

5. The process of claim 4 wherein the calcium chloride is added in an amount of about 0.1 to 1.0 percent by weight.

* * * * *